United States Patent Office 3,248,374
Patented Apr. 26, 1966

3,248,374
TERPOLYMERS CONTAINING VINYLIDENE CHLORIDE, A CYCLOMONOOLEFINE AND ANOTHER OLEFINIC MATERIAL
Edward Royals Covington, Richmond, Va., assignor to E. I. du Pont de Nemours and Company, Wilmington, Del., a corporation of Delaware
No Drawing. Filed June 14, 1961, Ser. No. 116,966
8 Claims. (Cl. 260—78.5)

This invention relates to the preparation of vinylidene chloride copolymers. More particularly, it relates to the preparation of vinylidene chloride copolymers having improved solubility in volatile organic solvents.

Coating flexible, transparent, water-sensitive films such as regenerated cellulose film, ethyl cellulose film, polyvinyl alcohol film, and the like with suitable coating compositions to render the base film moisture-resistant, heat-sealable, etc., is well known. Because of their toughness, flexibility, strength, transparency, heat-sealability and moisture-resistance, coatings composed of copolymers of vinylidene chloride with one or more polymerizable olefinic monomers have proven to be particularly useful. However, to achieve satisfactory moistureproofness, copolymers having rather high vinylidene chloride concentrations, i.e. in excess of 80% by weight, are necessary. Unfortunately, when prepared by the commonly used procedures of emulsion polymerization, copolymers containing 80% or more of vinylidene chloride are not sufficiently soluble in the common volatile organic solvents to be applied from solution using standard equipment. Hence, it has not been feasible to take full advantage of the superior properties of these copolymers as coatings for the various water-sensitive films.

It is an object of this invention to provide a process for preparing, with substantially complete conversion, copolymers containing 80% or more of vinylidene chloride which have improved solubility in volatile organic solvents and have excellent moistureproofness and coating characteristics. The preference is for a copolymer which is soluble to the extent of 10 parts per 40 parts of an 80/20 mixture of tetrahydrofuran and toluene at 65° C. Other objects will appear hereinafter.

The objects are accomplished in the process of preparing a vinylidene chloride copolymer by polymerizing 80–97%, by weight, preferably 80–93%, of vinylidene chloride with, correspondingly, 3–20%, by weight preferably 7–20%, of other monoolefinic material copolymerizable with vinylidene chloride, by adding prior to polymerization a small amount (from 0.1–20%), preferably 0.1–5%, based on the weight of the monomers, of a cyclomonoolefine, preferably cyclohexene, cycloheptene, cyclooctene and mixtures thereof.

It is essential that the polymerization "modifier" be added to the reaction charge either along with the mixture of polymerizable monomers prior to the initiation of the polymerization by the addition of the catalyst, or shortly thereafter but before any polymerization has occurred.

In a typical example of carrying out the process of this invention, 100 parts of a mixture of monomers containing 80–97 parts, by weight, of vinylidene chloride, 19.9–2.9 parts, by weight, of an alkyl ester of acrylic or methacrylic acid having 1–18 carbon atoms in the alkyl group, and 0.1–5 parts of either acrylic, methacrylic or itaconic acid is polymerized at the reflux temperature of the monomer mixture. The mixture is first dispersed by constant agitation in about 100 parts of an aqueous medium which contains a polymerization catalyst, an emulsifying agent and 1 to 3% of cyclohexene based upon the total weight of the monomers. To insure substantially complete conversion of the monomers to the copolymers, it is necessary to continue the reaction until refluxing has ceased. After the completion of the polymerization reaction, the vinylidene chloride copolymer is precipitated from the resulting dispersion by freezing and thawing. The precipitated copolymer is then removed by filtration, washed and then dried.

The preferred catalyst is a mixture of ammonium persulfate, meta-sodium bisulfite and ferrous ammonium sulfate, while the preferred emulsifying agent is a sodium salt of a sulfuric acid ester of a long chain alcohol such as sodium lauryl sulfate or a sodium salt of an alkyl aryl sulfonate such as sodium dodecyl benzene sulfonate. It should be pointed out that neither the concentration nor composition of either the polymerization catalyst or emulsifying agent is a critical variable in the process of this invention. However, these materials should be of such nature and present in sufficient concentration to insure completion of the polymerization reaction within a reasonable period of time (1–2 hours) and without appreciable precipitation of the resulting copolymer.

Because of their low cost and availability, sodium salts of alkyl aryl sulfonates and sodium salts of sulfonated fatty alcohols are preferred as emulsifying agents for use in the process of this invention as well as for stabilizing the dispersions prepared in this manner. If desired, however, an ammonium or amine salt, or some other water-soluble metallic salt of these compounds may be used. Other suitable emulsifying agents are: salts of long chain fatty acids, salts of sulfonated paraffin oils, quaternary ammonium compounds containing long carbon chains and salts of mono-amides of dibasic acids.

As the polymerization catalyst, one or more compounds from the following classes may be used: hydrogen peroxide, organic peroxides, azines, ketazines, persulfates and perborates. Salts of iron, manganese or cobalt may also be used to increase the activity of these catalysts.

Cyclohexene is the preferred polymerization "modifier" for use in this invention. Besides cyclohexene, cycloheptene and cyclooctene are also useful. Basically, these are all compounds having an unconjugated ring of at least 6 carbon atoms. In addition, they may have innocuous radicals attached to the carbons in the ring.

It should also be pointed out that the usefulness of the polymerization modifiers of this invention is not confined to the preparation of vinylidene chloride copolymers containing an alkyl ester of acrylic or methacrylic acid and either acrylic, methacrylic or itaconic acid. These "modifiers" may be also used in the preparation of copolymers formed by reacting 80–97% vinylidene chloride with 20–3% of one or more of the following monomers: phenyl methacrylate, cyclohexyl methacrylate, p-cyclohexylphenyl methacrylate, methoxyethyl methacrylate, glycidyl methacrylate, chloroethyl methacrylate, 2-nitro-2-methyl-propyl-methacrylate, and the corresponding esters of acrylic acid, methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, methylene diethyl malonate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single $CH_2=C$ group. The most useful ones fall within the general formula:

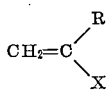

where R may be hydrogen, a halogen or a saturated aliphatic radical and X is selected from one of the following groups: —Cl, —Br, —F, —CH, $C_6H_5$, —COOH,

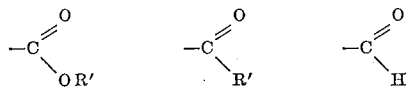

—$OC_6H_5$, —$CONH_2$, —CONH—R′, and —$CONR'_2$, in which R′ is alkyl.

The organic solvent-soluble vinylidene chloride copolymers of this invention are particularly useful for coating regenerated cellulose films. This, as well as other important aspects of the invention, will be illustrated in the examples which follow.

EXAMPLE 1

The coating composition is prepared by adding a dispersing agent (sodium lauryl sulfate), a "modifier" (cyclohexene), vinylidene chloride, methyl acrylate, itaconic acid and water to a vessel fitted with a reflux condenser. After stirring this mixture to disperse the ingredients, a solution of ammonium persulfate, meta-sodium bisulfite, ferrous ammonium sulfate in water is added to catalyze the reaction. The mixture is refluxed by constant agitation and maintaining the temperature between 32° C. and 34° C. The mixture is stirred until refluxing ceases, thereby indicating the completion of copolymerization. This occurs after about 60 minutes. The ingredients used in the preparation are summarized below:

|  | Parts by weight |
|---|---|
| Dispersing agent (sodium lauryl sulfate) | 4 |
| Vinylidene chloride | 366 |
| Methyl acrylate | 34 |
| Itaconic acid | 4 |
| Catalyzing agent: |  |
|     Ammonium persulfate | 2.4 |
|     Meta-sodium bisulfite | 2.4 |
|     Ferrous ammonium sulfate | .012 |
|  | 4.812 |
| Polymerization "modifier" (cyclohexene) | 20 |
| Water | 400 |

Upon completing polymerization, the resulting copolymer is isolated by freezing and thawing the dispersion and filtering the precipitated copolymer. The copolymer is washed thoroughly with water and dried. The yield of copolymer is almost 100%. It is completely soluble; has a relative viscosity of 1.246; and the 20% solution of the copolymer in 80/20 tetrahydrofuran toluene is stable for 8 days.

As a control, the composition is prepared using all of the above ingredients except that the polymerization "modifier" (cyclohexene) is omitted. The resulting copolymer is not soluble and has a relative viscosity of 1.859.

The description of the tests that are performed on the copolymer follows:

*Solubility* is determined by placing 10 parts of dried copolymer in 40 parts of an 80/20 mixture of tetrahydrofuran and toluene at 65° C. and agitating the mixture until all of the copolymer dissolves or until it is apparent that the copolymer is insoluble. If the copolymer dissolves completely and remains in solution upon being cooled to room temperature, it is "soluble." If, however, the copolymer fails to dissolve completely, or dissolves completely but precipitates or gels on being cooled to room temperature, the copolymer is considered "insoluble."

*Stability* of a 20% solution of each copolymer in an 80/20 tetrahydrofuran-toluene mixture is indicated by the number of days until gelation of the solution or precipitation of the copolymer occurs. To be useful as a coating composition, a copolymer solution must be stable for at least one day.

*Relative viscosity* of the copolymer is determined by the usual procedure of measuring the viscosity at 25° C. for a 1% weight/volume solution of the copolymer in tetrahydrofuran and dividing this value by the viscosity of the solvent at the same temperature.

The effectiveness of the copolymer is tested by coating it on a regenerated cellulose film. The coating is applied by passing the film through a coating bath containing a 20% solution of the copolymer in the 80/20 tetrahydrofuran/toluene mixture. Excess solution is doctored from the film surface. The coated film is then dried and tested. It has a coating weight, as dried, of 5.75 grams/square meter; an initial permeability value (IPV) of 72 grams of water lost/100 square meters/hour; and heat-seal strengths at 120° C. and 130° C. of 567 and 657 grams/1.5 inches, respectively.

The description of the tests that are performed on the coated film follows:

*Coating weight* is determined for cellulosic film by soaking the coated film in a hot solution of a sodium alkyl aryl sulfonate in acetic acid and stripping the coating from the film. The stripped coating in the form of a thin film is dried and weighed.

*IPV*—Initial permeability value is a measure of the moistureproofness of the coated film. The definition for and test for moistureproofness (IPV) are set forth in U.S. Patent 2,147,180 to Ubben. In general, a coated film having an IPV of 100 grams of water lost/100 square meters/hour or less is considered to have satisfactory moistureproofness.

*Heat-seal strength* is measured by cutting a piece of the coated film 4″ x 10″ with the grain running in the long or machine direction into two pieces 4″ x 5″ each. The two pieces are superimposed so that opposite surfaces are in contact. The two pieces of superimposed film are then sealed together at each end at right angles to the grain by applying a ¾″ wide sealing bar under carefully controlled conditions of temperature (120° C. and 130° C.), pressure (5 p.s.i.) and contact time (¼ second). The sealed sheets are then cut in half at right angles to the grain. From the center of the two resulting pieces, 1½″ wide strips parallel to the grain are cut. The resulting four sets of strips are tested by opening each set of strips at the free ends, placing them in a Suter testing machine and pulling them apart. The highest force in grams required to pull the strips apart is taken as a measure of the heat-seal bond strength.

EXAMPLE 2

The following ingredients are charged into a three-necked round bottom flask equipped with a stirrer and condenser, and then heated at 32–34° C. while being agitated until the polymerization reaction is complete:

|  | Parts |
|---|---|
| Water | 400 |
| Sodium lauryl sulfate (solids basis) | 4.0 |
| Vinylidene chloride | 370 |
| Methyl acrylate | 30 |
| Itaconic acid | 4 |
| Cycloheptene | 20 |
| Ammonium persulfate | 2.4 |
| Sodium toluene sulfinate | 2.4 |
| Ferrous ammonium sulfate | 0.012 |

The reaction time would be approximately 80 minutes, and the polymer would behave just as that illustrated in Example 1.

EXAMPLE 3

The same ingredients are used as in Example 2 except the catalyst system is changed to 1.20 grams of 30% hydrogen peroxide and 4.12 grams of ferrous ammonium sulfate. The reaction time would be 60 minutes and the polymer would behave as that in Example 1.

EXAMPLE 4

The following ingredients are charged into a pop bottle which is then sealed and tumbled in a constant temperature bath at 55° C. for five hours:

| | Parts |
|---|---|
| Water | 100 |
| Sodium lauryl sulfate (solids basis) | 2 |
| Vinylidene chloride | 92.5 |
| Methyl acrylate | 7.5 |
| Itaconic acid | 1.0 |
| Cyclooctene | 4.0 |
| α,α'-Azo-diisobutyronitrile | 2.0 |

Azo catalysts are not active at the lower temperature, so the polymerization must be carried out in a pressure vessel at slightly higher temperatures. The polymer is comparable in properties to that described in Example 1.

EXAMPLES 5–6

The following examples illustrate the preparation of vinylidene chloride copolymers by the process of this invention using various concentrations of the polymerization "modifier." In these examples, the copolymers are prepared by combining vinylidene chloride, methyl acrylate and itaconic acid in the ratio of 92.5/7.5/1.

The general procedure used in preparing these copolymer samples is similar to that described in Example 1 and consists of combining the following ingredients in a round-bottom flask equipped with a condenser, thermometer and stirrer, heating the mixture at 32–34° C. while agitating until the polymerization reaction is complete:

| | |
|---|---|
| Sodium lauryl sulfate | 4 parts (solids basis). |
| Vinylidene chloride | 370 parts. |
| Methyl acrylate | 30 parts. |
| Itaconic acid | 4 parts. |
| Polymerization "modifier" | As shown in Table I. |
| Ammonium persulfate (ASP) | As shown in Table I. |
| Meta-sodium bisulfite (MSB) | As shown in Table I. |
| Ferrous ammonium sulfate | 0.012 part. |
| Water | 400 parts. |

The amount of "modifier," ammonium persulfate and meta-sodium bisulfite; the reaction time; and the properties of the copolymer are shown in Table I.

carried out at any temperature from room temperature (20° C.) to 100° C. or higher and under a pressure of 1 atmosphere to 100 atmospheres or higher.

The coatings may be applied in accordance with any known coating techniques. They may be applied by passing the film through baths in a continuous manner or in a batch manner. Coatings may also be sprayed onto the film, or applied manually by brushing or the like. The thickness of the coatings may be adjusted in accordance with methods well known in the coating art.

The preferred base material for use in this invention is a regenerated cellulose shaped article, e.g. regenerated cellulose film. Other base materials which may be used in the invention include wood, paper, films and other shaped articles of cellulose acetate, cellulose propionate, cellulose acetatebutyrate, ethyl cellulose, hydroxyethyl cellulose, hydroxypropyl cellulose, carboxymethyl cellulose, the polyesters such as polyethylene terephthalate, the polyolefins, polyamides, metals, etc.

The materials of this invention are used advantageously as packaging materials for foods, cigarettes and the like. They provide flexible, strong materials that, due to improved heat-seal strength, can be easily converted to packages. This coating does not detract from the transparency of the base material.

As many widely different embodiments can be made without departing from the scope of the invention, it is understood that the invention is not limited except as defined in the appended claims.

Having fully disclosed the invention, what is claimed is:

1. In the process of preparing a vinylidene chloride copolymer by polymerizing in an aqueous emulsion system, until substantially complete conversion of all polymerizable monomers present has taken place to said copolymer, 80–97%, by weight, of vinylidene chloride with, correspondingly, 3–20%, by weight, of other monoolefinic material copolymerizable with vinylidene chloride having the formula $$CH_2=C\begin{matrix}R\\|\\X\end{matrix}$$

where R is selected from the group consisting of hydrogen, a halogen and a saturated aliphatic radical and X is selected from the group consisting of —Cl, —Br, —F, —CN, —C$_6$H$_5$, —COOH

Table I

| Example | "Modifier" | Parts "Modifier" | Parts ASP | Parts MSB | Reaction Time, Minutes | Soluble in THF/Toluene | Stability of Solution, Days | Relative Viscosity |
|---|---|---|---|---|---|---|---|---|
| Control | None | 0 | 1.2 | 0.6 | 50 | No | | 1.859 |
| 5 | Cyclohexene | 4 | 1.6 | 0.8 | 88 | Yes | 2 | 1.537 |
| 6 | Cyclohexene | 8 | 2.4 | 2.4 | 80 | Yes | 2 | 1.448 |

From the foregoing examples it is evident that a wide variety of ingredients may enter the preparation of the films. To obtain increased anchorage at high relative humidities, films sensitive to water vapor may be pretreated with anchoring resins, such as those disclosed in U.S. Patents 2,159,007; 2,280,829; 2,432,542; 2,533,557 and 2,546,575. The films, particularly regenerated cellulose film, may contain softeners or other constituents such as pigments, dyes, delusterants, plasticizers, etc., if desired. The important concept here and the one basic to this invention resides in the use of a polymerization "modifier" in the preparation of the copolymer of 80–97% by weight of vinylidene chloride and 3–20% by weight of a polymerizable mono-olefinic monomer. Polymerization may be —OC$_6$H$_5$, —CONH$_2$, —CONH—R', and —CONR'$_2$, in which R' is alkyl, the improvement comprising the step of adding prior to polymerization 0.1–20%, based on the weight of the monomers, of compound selected from the group consisting of cyclohexene, cycloheptene and cyclooctene.

2. A process as in claim 1 wherein said cyclomono-olefine is cyclohexene.

3. A process as in claim 1 wherein said cyclomono-olefine is cycloheptene.

4. A process as in claim 1 wherein said cyclomono-olefine is cyclooctene.

5. A process as in claim 1 wherein said other monoolefinic material is an alkyl acrylate having 1–18 carbon atoms in the alkyl group.

6. A process as in claim 1 wherein said other monoolefinic material is an alkyl methacrylate having 1-18 carbon atoms in the alkyl group.

7. A process as in claim 1 wherein said other monoolefinic material is methyl acrylate.

8. A process as in claim 1 wherein said other monoolefinic material is methyl acrylate and itaconic acid.

References Cited by the Examiner

UNITED STATES PATENTS

| | | | |
|---|---|---|---|
| 2,377,095 | 5/1945 | Muskat | 260—78.4 |
| 2,616,884 | 11/1952 | Marous | 260—92.8 |
| 3,041,208 | 6/1962 | Hay et al. | 260—29.6 |
| 3,058,962 | 10/1962 | Trofimow et al. | 260—87.7 |

FOREIGN PATENTS

| | | |
|---|---|---|
| 576,830 | 4/1946 | Great Britain. |
| 591,944 | 9/1947 | Great Britain. |
| 674,728 | 7/1952 | Great Britain. |

JOSEPH L. SCHOFER, *Primary Examiner.*

LEON J. BERCOVITZ, *Examiner.*